(12) United States Patent
Verma et al.

(10) Patent No.: US 7,089,161 B1
(45) Date of Patent: Aug. 8, 2006

(54) METHOD AND SYSTEM FOR CHARACTERIZING OPTICAL RECEIVERS BY MATHEMATICAL DERIVATION

(75) Inventors: Sumit Verma, Sunnyvale, CA (US); Mark Selker, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 714 days.

(21) Appl. No.: 10/045,870

(22) Filed: Jan. 10, 2002

(51) Int. Cl.
*G06F 17/10* (2006.01)
(52) U.S. Cl. .............................. 703/2; 398/24; 398/202
(58) Field of Classification Search .................... 703/2; 375/346; 398/17, 24, 202
See application file for complete search history.

(56) References Cited

U.S. PATENT DOCUMENTS

| | | | | |
|---|---|---|---|---|
| 4,475,210 A | * | 10/1984 | Couch | .......................... 375/224 |
| 5,056,101 A | * | 10/1991 | Magill et al. | .................. 372/32 |
| 6,229,633 B1 | * | 5/2001 | Roberts et al. | ................. 398/9 |
| 6,574,268 B1 | * | 6/2003 | Bergamo | ..................... 375/142 |

* cited by examiner

Primary Examiner—Albert W. Paladini

(57) ABSTRACT

The present invention describes the method and system for characterizing optical receivers based on the measured impulse response and by applying linear system theory. In a first embodiment, the impulse response of an optical receiver is obtained. Convolving the impulse response with band-limited input pulses (modeled with straight-line edge pulses), a receiver output pulse can then be determined. From this pulse, an associated eye diagram can be mathematically derived and the maximum ISI can be estimated. In a second embodiment, for a given input pulse stream with a specified amount of noise, the impulse response-generated eye diagram is used to estimate the bit error rate (BER) that the receiver would yield.

9 Claims, 3 Drawing Sheets

METHOD AND SYSTEM FOR CHARACTERIZING OPTICAL RECEIVERS BY MATHEMATICAL DERIVATION

BACKGROUND INFORMATION

1. Field of the Invention

This invention relates to optical receiver design, and more specifically to characterizing optical receiver performance based on receiver impulse response.

2. Description of Related Art

High-speed optical equipment such as a 40 Gb/s optical receiver can be characterized by an eye diagram that graphically illustrates the equipment's performance.

Eye diagrams provide a qualitative understanding of a receiver's performance, and the method of eye diagrams' construction is well documented in publicly available documents. The amount of Inter Symbol Interference (ISI) determines the extent of eye closure, and a large ISI indicates poor equipment performance. Moreover, the concepts of ISI and eye closure are both well documented and described in conventional systems.

Understanding the amount of eye closure from ISI in a band-limited system is key to proper analysis of systems such as 40 Gb/s receivers.

However, constructing a system capable of generating and viewing optical pulses needed to test such receivers currently is prohibitively expensive. Furthermore, few organizations are capable of designing or manufacturing such a system, and the excessive cost incurs an undesirable burden.

Accordingly, there is a need for an economical means for characterizing high-speed optical equipment.

SUMMARY OF INVENTION

The present invention describes the method and system for characterizing optical receivers based on measured impulse response and the use of linear system theory. Understanding the amount of eye closure from inter symbol interference (ISI) due to the receiver for a band-limited system is an enabling feature for the proper operation of 40 Gb/s systems.

In a first embodiment, an impulse response of an optical receiver is measured. Convolving this impulse response with band-limited input pulses (first order modeled with straight-line edge pulses), a receiver output pulse can then be determined.

Furthermore, from the receiver output pulse, an associated eye diagram can be mathematically derived and the maximum ISI be estimated. Thereby, the eye diagram may then be used to characterize the receiver without constructing a costly test system.

In a second embodiment, for a given input pulse stream with a specified amount of noise, the impulse response-generated eye diagram is used to estimate the bit error rate (BER) that the system would yield.

BRIEF DESCRIPTION OF DRAWINGS

The accompanying drawings that are incorporated in and form a part of this specification illustrate embodiments of the invention and together with the description, serve to explain the principles of the invention.

DETAILED DESCRIPTION

The following description is presented to enable one of ordinary skill in the art to make and use the invention and is provided in the context of a patent application and its requirements. In the following description, specific nomenclature is set forth to provide a thorough understanding of the present invention. It will be apparent to one skilled in the art that the specific details may not be necessary to practice the present invention. Furthermore, various modifications to the embodiments will be readily apparent to those skilled in the art and the generic principles herein may be applied to other embodiments. Thus, the present invention is not intended to be limited to the embodiments shown but is to be accorded the widest scope consistent with the principles and features described herein.

Figure 1:
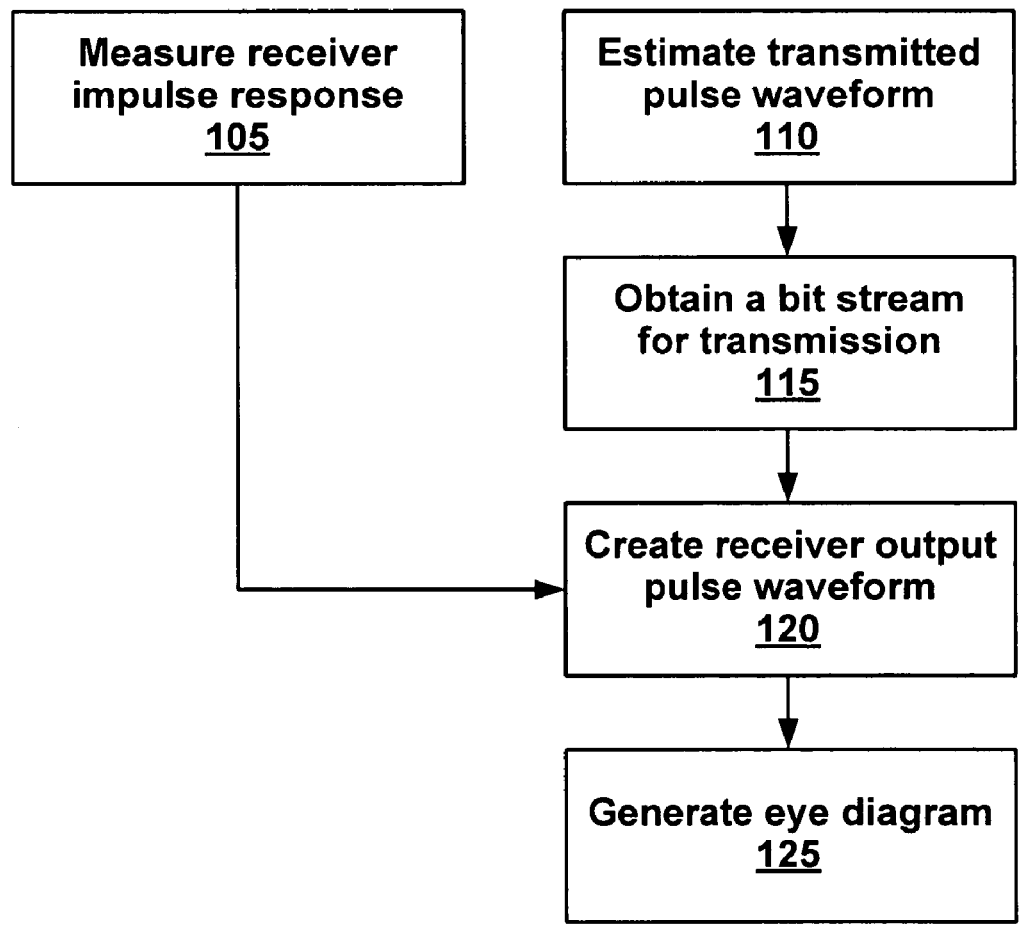
FIG. 1 is a flow diagram illustrating steps for constructing an eye diagram characterizing an optical receiver in accordance with one embodiment of the present invention.

FIG. 1 is a flow diagram 100 illustrating steps for constructing an eye diagram characterizing an optical receiver in accordance with one embodiment of the present invention. Furthermore, the steps described herein are in accordance with a 40 Gb/s (G) optical system. However, one of ordinary skill in the art would recognize that such techniques are extensible to systems beyond or less than 40 Gb/s operating speed.

In step 105, a receiver impulse response is measured, and the resulting data is then used to create a receiver output pulse stream in step 120.

In step 110, a transmitted "pulse" incident on the receiver is estimated. Moreover, according to communication theory, the "pulse" is a function representing individual symbol for all time.

Figure 2:
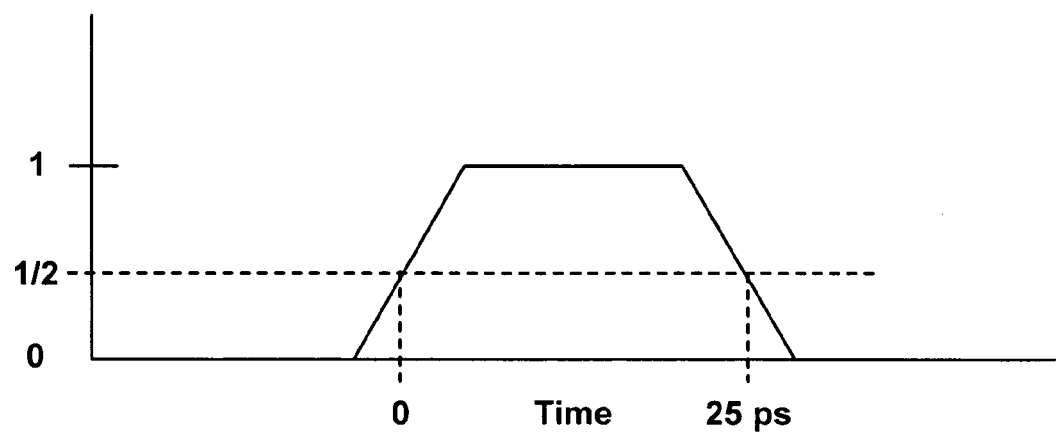
FIG. 2 is a graph depicting a pulse waveform in accordance with one embodiment of the present invention.

Referring now to FIG. 2 in light of FIG. 1, the figure shows an example of the pulse described in step 110 of FIG. 1. The pulse shown in FIG. 2 exhibits no ISI, as it does not exist at the midpoint of the previous bits or the following bits. Furthermore, the pulse has a non-zero rise/fall time that is significant with respect to the bit period itself, and therefore is a band limited pulse.

Referring now back to FIG. 1, resulting pulse waveform data from step 110 are used in step 115 to build a bit stream by summing up the pulses.

Furthermore, the bit stream is obtained by first multiplying the pulse shape with either a+1 or 0, depending on whether a binary mark or space is to be transmitted; then shifting the pulse shape by an appropriate number of integer bit periods (T); and finally adding to the resulting pulse shape to the overall waveform. Mathematically, the process corresponds to:

$$\text{Transmitted waveform} = TX(t) = \sum_n a_n * P(t - n * T) \quad (1)$$

The variable $a_n$ is the information-bearing bit, with a value of +1 or 0; the variable P is the pulse shape transmitted; and the variable T is the bit period, which is 25 picoseconds (ps) in the illustrated example of FIG. 2.

Moreover, because the purpose of the present invention is to characterize the band limited performance of a receiver, transmitter related impairments such as the extinction ratio of the transmitted optical pulse are herein overlooked in the descriptions of the present invention.

For example, the extinction ration is disregarded in the above formula by representing a space with a zero value; however, one of ordinary skill in the art would recognize that the extinction ratio penalty can easily be accounted for independently. Furthermore, one skilled in the art would recognize that a full system characterization would take such overlooked factors into account.

As noted above, a desired test waveform does not exhibit ISI itself. However, the final results are still valid for a system if the transmitted waveform does have ISI. The resulting data from step 115 are then used to create a receiver output pulse waveform in step 120.

In step 120, to create a pulse waveform at the output of the receiver, linear system theory states that the input pulse function resulting from step 115 convolves with the impulse response of the receiver resulting from step 105. The convolution of step 120 is stated as below, where the function I(t) represents the impulse response of the receiver, and the function X(t) represents the resultant pulse:

$$X(t) = \int P(t) * I(t-\tau) d\tau \quad (2)$$

The function may be carried out with one or more popular math tools available today such as Mathematica or Matlab. Furthermore, by the principle of superposition, the output of step 120 is then:

$$\text{Received waveform} = RX(t) = \sum_n a_n * X(t - n*T + d) \quad (3)$$

where the variable d represents the delay through the system.

In step 125, the received waveform from step 120 is repeatedly redrawn every bit period of T seconds. Moreover, creating a random input bit stream and running a large number of bits will allow the eye to "fill in" as is seen on oscilloscopes.

The eye diagram gives a qualitative understanding of the performance of the receiver. Key system parameters such as eye closure and deterministic jitter are obtained through eye diagrams.

A second embodiment of the present invention may be used to create a pass/fail performance metric for the receiver by estimating the maximum possible ISI present. This technique can be implemented by estimating the maximum ISI. Let the "midbit" value of the kth bit be denoted as $RX_k$. Hence:

$$RX_k = a_k * X_0 + \sum_{n \neq k} a_n * X_{k-n} \quad (4)$$

The term outside the summation is the unperturbed bit, while the remaining summation is the ISI. Hence, the worst case ISI is bounded by:

$$ISI_{\max} = \left(\sum_{n \neq k} \text{abs}(X_{k-n})\right) / X_0 \quad (5)$$

where abs (*) is the absolute value function, and summing the "midbit" values of the convolution of the receiver's impulse response with the transmitter pulse function gives the maximum ISI in a linear system. Moreover, the midbit value of a mark is designated as $X_0$ in order to ensure that the denominator value is not zero, and thereby ensuring that $ISI_{max}$ is non-divergent.

Figure 3:
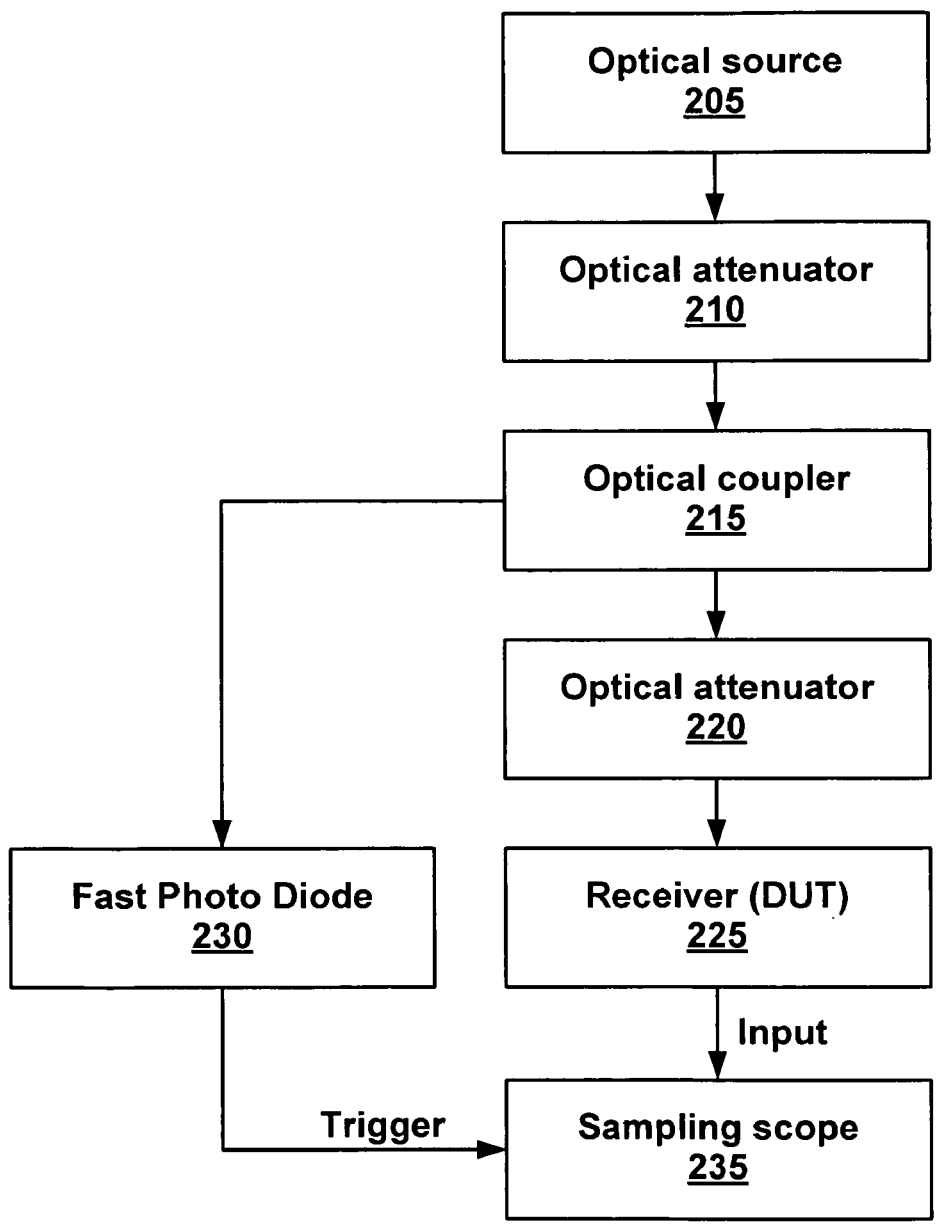
FIG. 3 is a system diagram illustrating a physical layout of instruments used to measure receiver impulse response in accordance with one embodiment of the present invention.

FIG. 3 is a system diagram 200 depicting a physical layout of instruments used to measure the receiver impulse response, such as those used in step 105 of FIG. 1. The system 200 comprises: an optical source 205, a first optical attenuator 210, an optical coupler 215, a second optical attenuator 220, a fast photo diode 230, a receiver or device under test (DUT) 225, and a sampling scope 235.

Fast optical source 205 with a reasonably slow repetition rate (<=100 MHz) ultimately inputs to sampling scope 235. Specifically, the output of optical source 205 is coupled to the input of optical attenuator 210; the output of optical attenuator 210 is coupled to the input of optical coupler 215, the output of the coupler is in turn coupled to both the input of fast photo diode 230 and the input of optical attenuator 220; the output of fast photo diode 230 is coupled to a trigger for sampling scope 235; and the output of optical attenuator 220 is coupled to the input of optical receiver 225, whose output is in turn coupled to an input to sampling scope 235.

A wide bandwidth input pulse source (>600 GHz assuming a Gaussian optical pulse profile) assures only modest correction for the input itself being a flawed "impulse". The key is to be sufficiently higher in bandwidth than that of the receiver being tested. The optical attenuators 210 and 220 ensure adequately low peak input power to keep the device within its linear range, and provide independent control of the input power to receiver 225 and fast photo diode 230.

Fast photo diode 230 has a high bandwidth (~40–50 GHz for a 40 GHz system) and is able to withstand high input peak power. Wide band attenuators should be used if reflections are an issue.

Moreover, any averaging that takes place is done external to the scope (after realigning individual samples), or the impulse response will be artificially widened due to drift of the input source and/or scope. Furthermore, the amplitude response of the scope versus frequency is calibrated against an RF power meter.

The present invention presents a method for characterizing optical receivers that relies on linear system theory. Additionally, note that all practical systems, either Non Return to Zero (NRZ) or Return to Zero (RZ) will be highly band limited. Therefore, inputs to receivers will have pulse rise times that are a fairly significant percentage of the bit period.

For example, a 14 ps 10–90% rise time, corresponding to roughly 25 GHz input bandwidth (3 dBe) for NRZ, is quite reasonable. This is significantly slower than the 7 ps rise time of the measuring device (50 GHz sampling scope) itself, and measurements made with the scope are reasonably valid representations of the response for the band limited system. Sampling rates that are an order of magnitude (10×) above the system being tested can provide measurements of much greater accuracy, but equipment that operate at such frequencies do not yet exist.

Although the invention has been described in connection with several embodiments, it is understood that this invention is not limited to the embodiments disclosed, but is capable of various modifications that would be apparent to a person skilled in the art.

For example, above descriptions of the present invention are in accordance with a 40 Gb/s optical receiver, however, the invention may be tailored to apply to other systems with different specifications and conditions.

Moreover, in the descriptions for step 120 in FIG. 1, the convolution is carried out with Mathematica or Matlab. Note that the convolution and the subsequent eye diagram generation may also be carried out by one of several alternative mathematics tools available today.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the arts to best utilize the invention and various embodiments with various modifications as are suited to the particular use contemplated. It is intended that the scope of the invention be defined by the Claims appended hereto and their equivalents.

We claim:

1. A method for characterizing a digital optical receiver, comprising:

creating an output pulse waveform by convolving a receiver impulse response and an input pulse;

generating an eye diagram by repeatedly overlaying the output pulse waveform every bit period.

2. The method of claim 1, further comprising:

prior to the creating step, obtaining a bit stream for transmission, thereby generating an input sequence.

3. The method of claim 2, further comprising:

prior to the obtaining step, estimating a transmitted pulse input waveform for a receiver, thereby generating pulses used to obtain the bit stream.

4. The method of claim 3, further comprising:

prior to the estimating step, measuring the receiver impulse response from the receiver.

5. The method of claim 2, wherein the bit stream is obtained as follows:

$$\Sigma_n a_n * P(t - n*T)$$

where P is a pulse shape, T is a pre-determined bit period, and an is the input sequence.

6. The method of claim 1, wherein the output pulse waveform is obtained as follows:

$$\Sigma_n a_n * X(t - n*T + d)$$

where T is a pre-determined bit period, an is an input sequence, d is the delay in the receiver, and X( ) is a function for creating a pulse stream.

7. The method of claim 1, further comprising:

after the generating step, estimating a worst case bit rate error (BER) and an amount of noise present in the receiver from an amount of eye closure in the eye diagram.

8. A computer-implemented method, comprising:

(a) creating a first output pulse waveform by convolving a first receiver impulse response and a first input pulse;

(b) generating an eye diagram from the first output pulse waveform at a first bit period;

(c) creating a second output pulse waveform by convolving a second receiver impulse response and a second input pulse; and (d) generating the eye diagram by overlaying the first output pulse waveform with the second pulse waveform at a second bit period.

9. The method of claim 8, further comprising:

repeating steps (c) and (d) for a subsequent bit period.

* * * * *